United States Patent
Landoll et al.

(10) Patent No.: US 6,224,082 B1
(45) Date of Patent: May 1, 2001

(54) CAM ACTION DETACHABLE GOOSENECK TRAILER

(75) Inventors: Donald R. Landoll, Marysville; Loren Wassenberg, Blue Rapids; Kyle Swart, Marysville; Paul Roesner, Marysvills; Keith Vacha, Marysville, all of KS (US)

(73) Assignee: Landoll Corporation, Marysville, KS (US)

( * ) Notice: Subject to any disclaimer, the term of this patent is extended or adjusted under 35 U.S.C. 154(b) by 0 days.

(21) Appl. No.: 09/399,480

(22) Filed: Sep. 20, 1999

(51) Int. Cl.$^7$ .................................................. B62D 53/06
(52) U.S. Cl. ..................... 280/425.2; 280/477; 414/481
(58) Field of Search .............................. 280/425.1, 425.2, 280/463, 477, 478.1; 414/481

(56) References Cited

U.S. PATENT DOCUMENTS

| | | | |
|---|---|---|---|
| 2,489,112 | * 11/1949 | Talbert | 280/425.2 |
| 2,871,027 | * 1/1959 | Brockman | 280/425.2 |
| 2,963,302 | * 12/1960 | Ronk | 280/425.2 |
| 3,030,126 | * 4/1962 | Martin | 280/425.2 |
| 3,498,636 | 3/1970 | Jahn et al. . | |
| 3,698,582 | 10/1972 | Weinmann . | |
| 3,874,703 | * 4/1975 | Ross et al. | 280/425.2 |
| 4,103,793 | 8/1978 | Weaver . | |
| 4,400,005 | 8/1983 | Losh . | |
| 4,413,836 | 11/1983 | Losh . | |
| 4,423,885 | 1/1984 | Camey et al. . | |
| 4,472,100 | 9/1984 | Wagner . | |
| 4,513,987 | 4/1985 | Whitaker . | |
| 4,580,830 | 4/1986 | Holt et al. . | |
| 4,635,997 | 1/1987 | Holt et al. . | |
| 4,728,114 | * 3/1988 | Bills | 280/425.2 |
| 4,806,065 | 2/1989 | Holt et al. . | |
| 5,403,029 | 4/1995 | Zerbe et al. . | |
| 5,415,425 | 5/1995 | Zerbe et al. . | |
| 5,435,586 | 7/1995 | Smith . | |

OTHER PUBLICATIONS

Talbert brochure entitled "Talbert S Series 3 Axels" Bulletin No. 202 (publication date unknown).
Landoll Corporation brochure entitled "Easy–Hooker Contractor's Special 35 and 50 Ton Series Detachable Gooseneck Trailers" (Jul. 1988).

* cited by examiner

Primary Examiner—Daniel G. DePumpo
(74) Attorney, Agent, or Firm—Hovey, Williams, Timmons & Collins

(57) ABSTRACT

A detachable gooseneck trailer (20) having a gooseneck (24) and a detachable trailer deck (22) utilizes a trailer attachment assembly (30) to draw the trailer deck (22) toward the gooseneck (24) during attachment. The attachment assembly (30) includes a pivoting carrier (66) having a retainer leg (84) with a rearward facing load carrier engagement surface (90). A slide member (68) is attached to the trailer deck (22) and provides a forward facing slide member engagement surface (94). As actuators (70) pivot the carrier (66) rearward, the load carrier engagement surface (90) slides over the slide member engagement surface (94). A latching mechanism (34) utilizes an elongated latch plate (122) pivotally mounted on the retainer leg (84) to automatically latch the carrier (66) to the trailerdeck (22). A latch biasing spring (124) biases the latch plate (122) toward its latched position, so that it automatically engages a catch (126) mounted on the trailer deck. A lift mechanism (36) utilizes lift actuator arms (148) extending from the tops of the load carrier ends (74, 76) to push down carrier arms (144) and support the gooseneck (24) above the ground. A ride height lock assembly (37) includes a pair of pawls (178) and a pair of ratchets (180) to lock the trailer deck at a desired ride height.

11 Claims, 10 Drawing Sheets

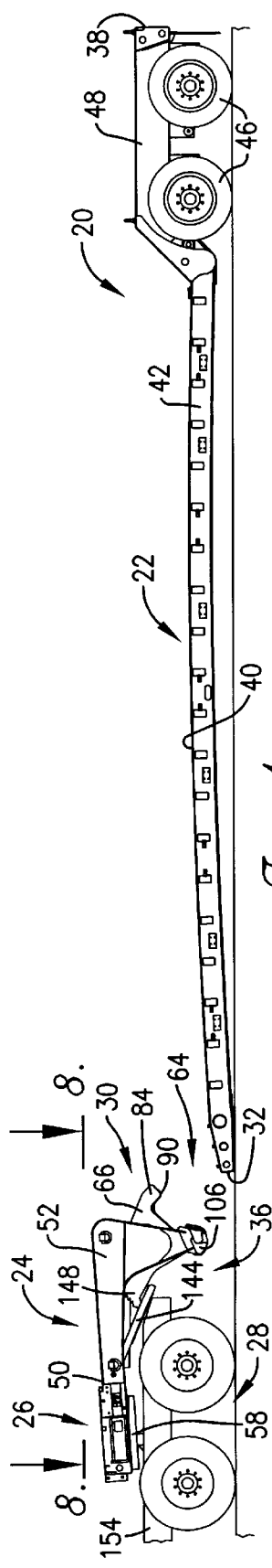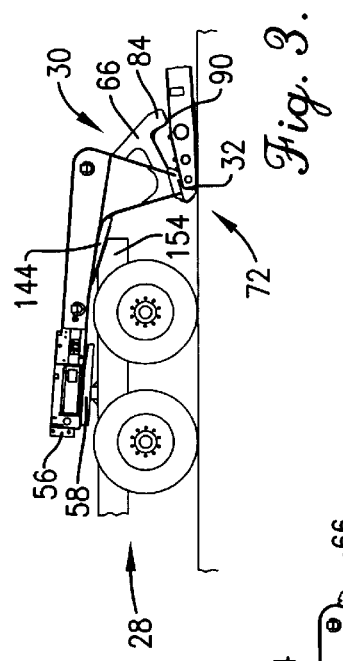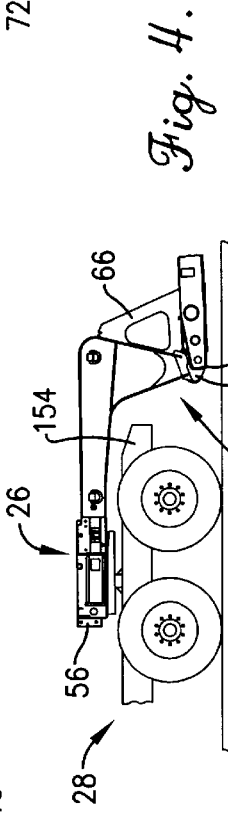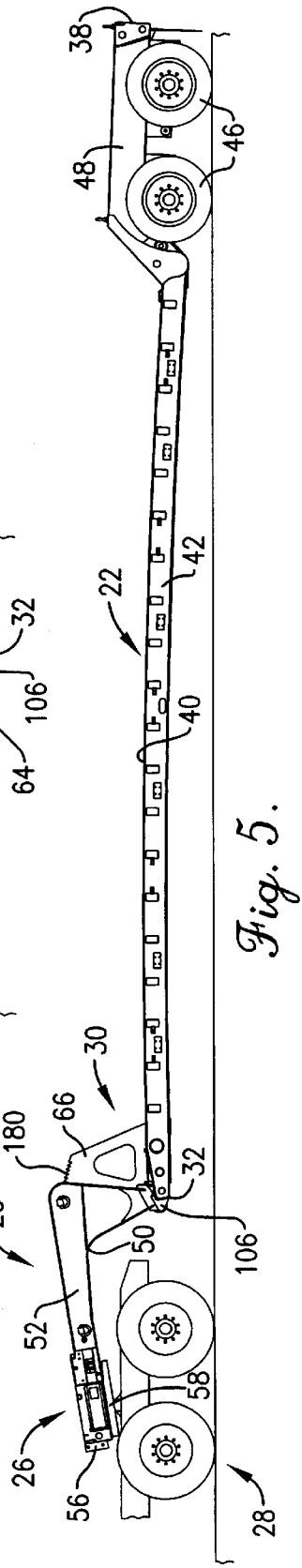

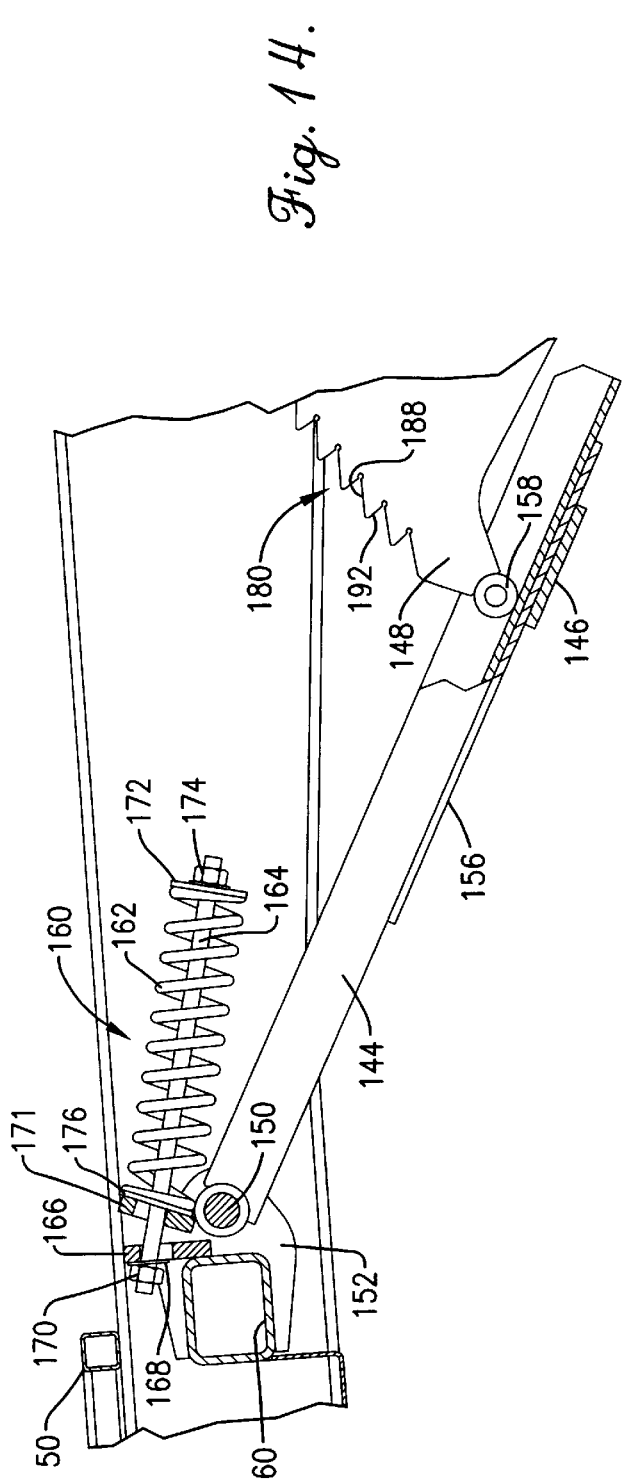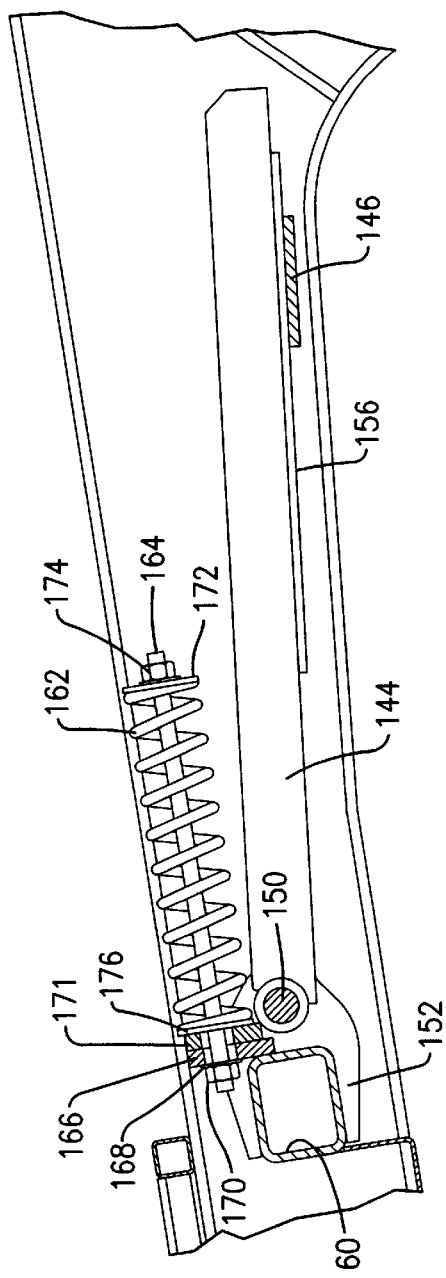

CAM ACTION DETACHABLE GOOSENECK TRAILER

TECHNICAL FIELD

This invention relates to trailers and, more particularly, to trailers with detachable goosenecks permitting the trailers to be loaded from the front ends of the trailer decks.

BACKGROUND

Trailers are frequently used to transport heavy equipment and machines such as farm tractors and implements. Given the size and weight of this equipment, various trailer configurations and loading methods have been devised. One configuration is commonly know as a detachable gooseneck trailer. A typical detachable gooseneck trailer includes a gooseneck which is coupled with a towing vehicle and a trailer deck which removably attaches to the gooseneck. To load and unload a detachable gooseneck trailer, the trailer deck is lowered to the ground and detached from the gooseneck. The towing vehicle and gooseneck are pulled forward away from the trailer deck, and equipment is loaded onto the trailer deck by driving onto the front of the trailer deck. After the equipment is loaded, the towing vehicle and gooseneck are backed up to the trailer deck, and the gooseneck and trailer deck are reattached for transport. Unfortunately, difficulties are frequently encountered when attaching the gooseneck to the trailer deck.

When attaching the gooseneck to the trailer deck, an operator is required to back the gooseneck into alignment with the trailer deck. Achieving an alignment which is close enough to permit attachment is difficult and may take several tries. This difficulty is compounded when equipment is being loaded in a field or at a construction site where both the trailer deck and towing vehicle are likely resting on uneven ground. When one or both of the gooseneck and trailer deck are tilted from side to side because they are supported on uneven ground, the operator may experience considerable difficulty in achieving an alignment permitting attachment of the gooseneck and trailer deck with, for example, a vertical pin type connection.

SUMMARY OF THE INVENTION

Accordingly, one object of the present invention is to provide an improved detachable gooseneck trailer with an improved trailer attachment assembly, making it easier to detach and attach the trailer deck with the trailer gooseneck, even when the trailer and gooseneck are supported on uneven ground.

In carrying out the foregoing and other objects, the present invention contemplates an improved trailer attachment assembly for detachably connecting the trailer deck with the trailer gooseneck. The assembly includes a load carrier movable between a detached position and an attached position. The load carrier includes a load carrier engagement surface, and a trailer deck engagement surface which is provided to engage the load carrier engagement surface. An actuator is operatively coupled with the load carrier to move the load carrier into its attached position, thereby bringing the two engagement surfaces into contact and drawing the trailer deck toward the gooseneck.

In a preferred embodiment, a front end securement protrusion extends inwardly from the deck, and a receiver is defined by the gooseneck. The receiver is configured to receive the protrusion and secure the front end of the trailer to the gooseneck. To draw the trailer deck toward the gooseneck, at least one, but preferably both of the engagement surfaces comprise an incline extending downwardly in a direction from the front end to the back end of the trailer. Preferably, both of the engagement surfaces comprise constant radius arcs. The load carrier engagement surface is preferably elongated between opposite ends of the load carrier which are positioned on opposite sides of the central longitudinal axis of the trailer deck. The trailer deck engagement surface is also elongated and extends beyond the load carrier ends. The load carrier preferably comprises a pivot member which pivots between the detached and attached positions. The pivot member has a retainer leg which provides the load carrier engagement surface. As the pivot member pivots toward the attached position, the load carrier engagement surface engages the trailer deck engagement surface, and the load carrier engagement surface slides over the trailer deck engagement surface.

It is further contemplated in the practice of the invention that the trailer attachment assembly will be used in combination with a trailer having a substantially rigid gooseneck frame with the load carrier pivotally attached to a lower end of the gooseneck frame. A trailer deck supports a slide member which provides the trailer deck engagement surface. The trailer also includes a plurality of ground engaging wheels rotatably mounted to the trailer deck.

The invention is further directed to a trailer attachment assembly latching mechanism having a pivotal latch plate, a latch plate biasing member, and a rigid catch positioned to engage the latch plate when the latch plate is in a latched position. The latch plate biasing member biases the latch plate toward the latched position.

In a preferred embodiment, the latching mechanism also includes a lever arm fixedly attached to the latch plate. The latch plate biasing member engages the lever arm and is in tension, so that the biasing member pulls the latch plate toward the latched position. A retraction member engages another lever arm and is operative to overcome the latch plate biasing member and pivot the latch plate into an unlatched position. The latch plate is preferably elongated, and the catch preferably includes first and second catch blocks positioned adjacent opposite ends of the latch plate. The invention contemplates using the latching mechanism in combination with the attachment assembly and trailer.

The invention is still further directed to a trailer attachment assembly lift mechanism operable to support the gooseneck above the ground when the gooseneck is detached from the trailer deck. The lift mechanism includes a carrier arm pivotal about a hinge pin between a lift position and a retracted position. In the lift position the carrier arm engages a towing vehicle frame. A lift arm actuator extends forward from the movable load carrier to engage the carrier arm and force it into the lift position when the load carrier is moved to the detached position.

In a preferred embodiment, a carrier arm biasing member biases the carrier arm toward the retracted position away from the tow vehicle frame. Preferably, the carrier arm biasing member is in compression. A skid is connected to a terminal end of the carrier arm and is slidably received in a channel of the carrier arm. Preferably, the lift mechanism is provided with a pair of carrier arms connected by a cross member, and another lift actuator arm is provided to engage the second carrier arm. The invention contemplates using the lift mechanism in combination with the attachment assembly and trailer.

BRIEF DESCRIPTION OF THE DRAWINGS

FIG. 1 is a partially exploded side view of a detachable gooseneck trailer having a trailer deck, gooseneck, and trailer attachment assembly according to the present invention and illustrating the trailer deck detached from the gooseneck;

FIG. 2 is a partially exploded, fragmentary side view of the trailer of FIG. 1 illustrating a step in attaching the gooseneck to the trailer deck;

FIG. 3 is a fragmentary side view of the trailer of FIG. 1 illustrating a subsequent step in attaching the gooseneck to the trailer deck;

FIG. 4 is a fragmentary side view of the trailer of FIG. 1 illustrating the gooseneck attached to the trailer deck;

FIG. 5 is a side view of the trailer of FIG. 1 illustrating the gooseneck attached to the trailer deck and with the trailer deck in a maximum ride height position;

FIG. 14 is a fragmentary view in partial cross section of the lift mechanism of FIG. 6 taken along line 14—14 in FIG. 8 and illustrating a lift position;

FIG. 15 is a fragmentary view in partial cross section of the lift mechanism of FIG. 6 and illustrating a retracted position;

DETAILED DESCRIPTION

Figure 6:
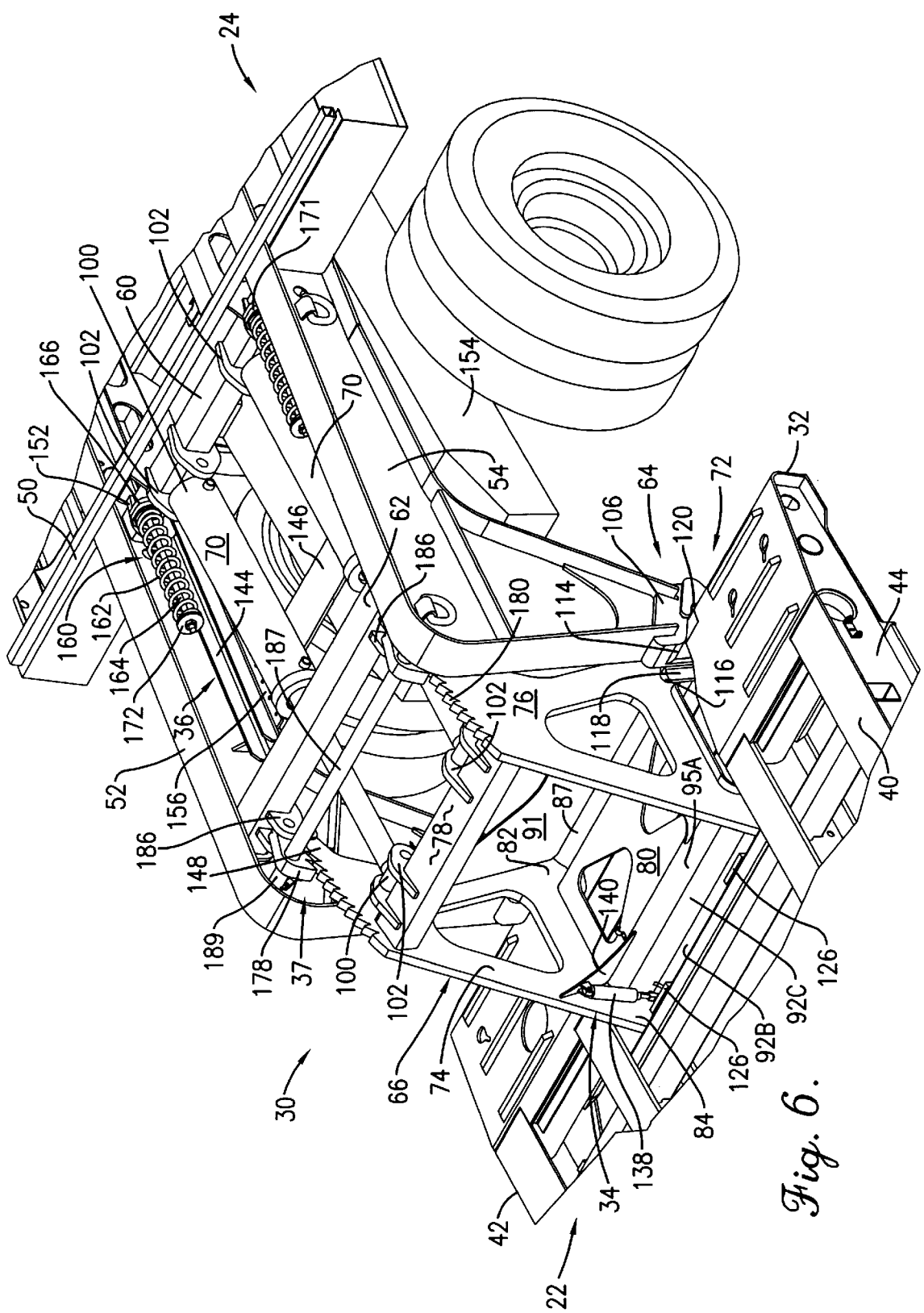
FIG. 6 is a perspective view of the trailer attachment assembly of FIG. 1 and further illustrating a latching mechanism, a lift mechanism, and a ride height lock assembly.

Referring to the drawings in greater detail, the trailer 20 shown in FIGS. 1 and 6 includes a trailer deck 22 and a trailer gooseneck 24 having a towing vehicle attachment 26 for attaching the gooseneck 24 to a towing vehicle 28 (partially shown). The gooseneck 24 and deck 22 are detachably joined by a trailer attachment assembly 30 adjacent a front end 32 of the trailer deck. When the trailer deck 22 and gooseneck 24 are detached, equipment can be loaded and unloaded from the front end 32 of the deck. The trailer 20 is also provided with a latching mechanism 34 to automatically latch the gooseneck to the deck and with a lift mechanism 36 which supports the gooseneck 24 above the ground when the gooseneck is detached from the deck 22. When the gooseneck 24 and deck 22 are attached and the deck is lifted off the ground, a ride height lock assembly 37 holds the gooseneck 24 and deck 22 at the desired ride height.

Referring to FIGS. 1, 5, and 6, the substantially rigid trailer deck 22 is elongated between the front end 32 and a back end 38. A central, longitudinal axis extends between the front and back ends 32, 38. An upper support surface 40 extends between left and right side frame members 42, 44. The directions left and right are defined looking from the back end 38 to the front end 32 of the trailer deck 22. The upper support surface 40 is configured to receive cargo thereon, especially heavy equipment such as farm implements and tractors. A plurality of ground engaging wheels 46 are rotatably mounted to the trailer deck 22 adjacent to the back end 38. The wheels permit the front end 32 of the trailer deck 22 to be raised and lowered about a first transverse axis at the wheels 46. In a loading position (FIG. 1), the front end 32 is lowered to the ground, and the deck 22 is inclined upwardly and rearward with the back end 38 above the ground. In a transport position (FIGS. 4 and 5), the deck 22 is substantially level with both the front and back ends 37, 38 disposed above the ground. To load equipment over the wheels 46, the trailer deck has a raised portion 48 at the back end 38. Adjacent the side frame members 42, 44, the trailer deck 22 decreases in thickness toward the front end 32 of the trailer, so that equipment can be loaded onto the front end of the trailer deck. To further facilitate driving equipment onto the deck, fold down ramps (not shown), can be hingedly attached to the front end 32 of the deck 22. However, the trailer attachment assembly 30 of the present invention allows the front end 32 to decrease substantially in thickness and thus, generally renders fold down ramps unnecessary.

Figure 8:
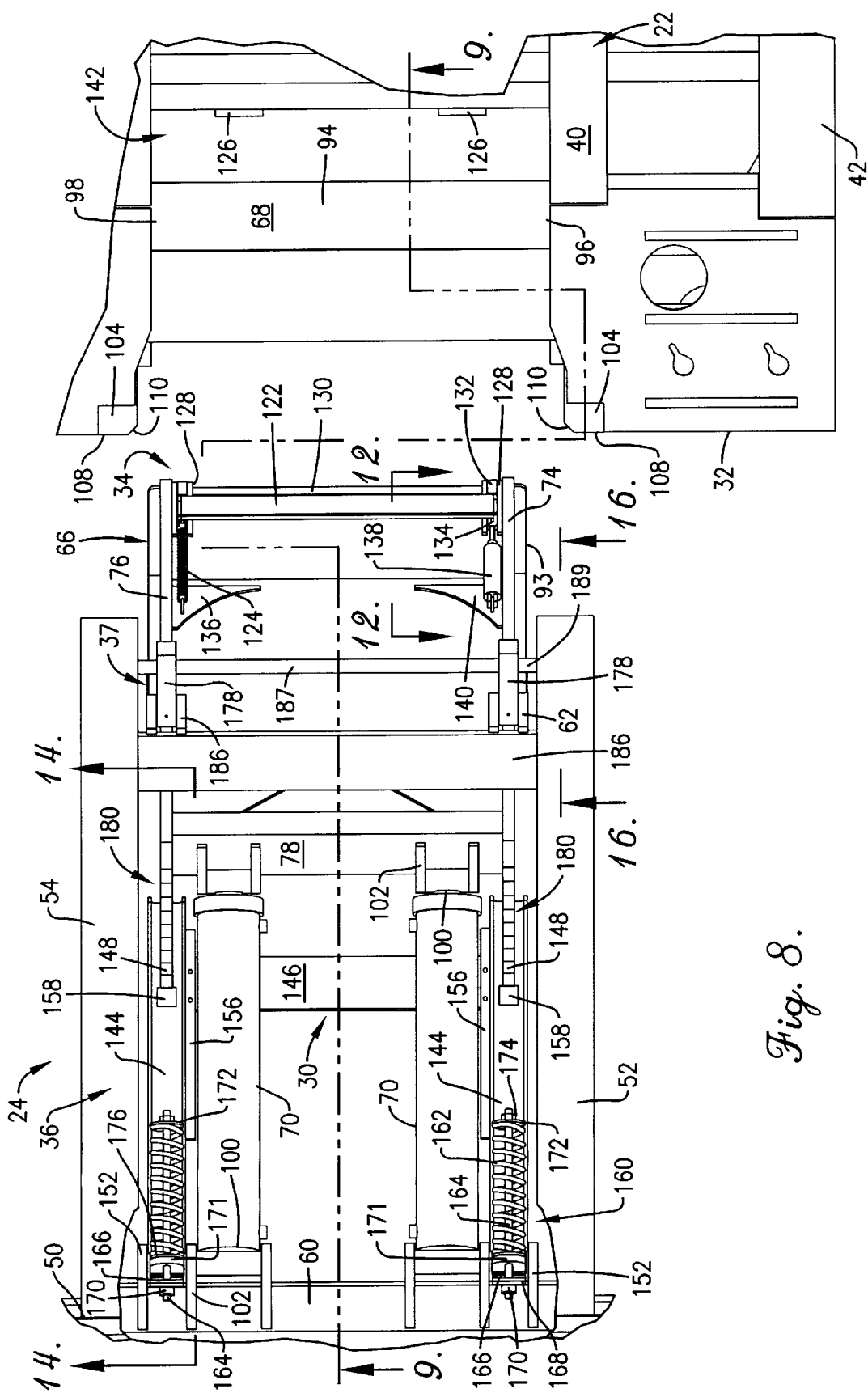
FIG. 8 is a fragmentary, partially exploded top plan view of the trailer of FIG. 1 and taken from the perspective of line 8—8 in FIG. 1.

Referring to FIGS. 2, 6, and 8, the gooseneck 24 includes a substantially rigid gooseneck frame 50 having left and right gooseneck frame members 52, 54. The towing vehicle attachment 26 is attached to the gooseneck frame 50 adjacent an upper-front end 56 (FIG. 2) of the gooseneck frame. The towing vehicle attachment 26 preferably comprises a fifth wheel connector having a king pin (not shown) for connection with the towing vehicle connection device 58 (FIG. 2). The towing vehicle attachment 26 allows the gooseneck to pivot about a third transverse axis at the pivot of the towing vehicle attachment 26 and the connection device 58. The gooseneck frame includes a forward cross bar 60 and a rearward cross bar 62 which stabilize the gooseneck frame 50. Further, the forward cross bar 60 mounts portions of the trailer attachment assembly 30 and the lift mechanism 36, and the rearward cross bar 62 mounts portions of the ride lock assembly 37. A lower end 64 of the gooseneck 24 is positioned behind the towing vehicle 28 and pivotally mounts a portion of the trailer attachment assembly 30 between the left and right gooseneck frame members 52, 54.

Figure 7:
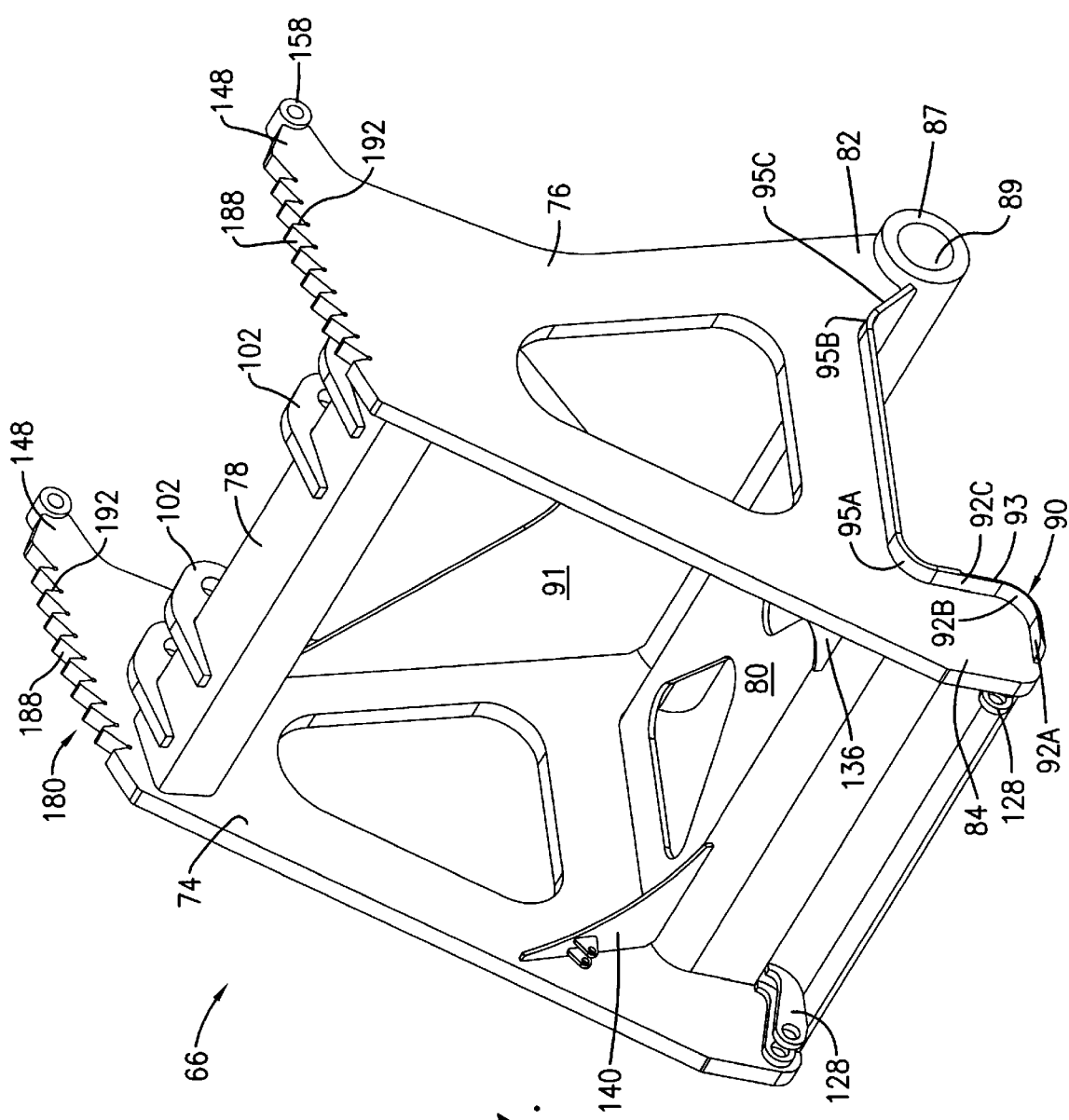
FIG. 7 is a perspective view of a load carrier pivot member of the trailer attachment assembly of FIG. 1.

Referring to FIGS. 6, 7, and 8, the trailer attachment assembly 30 includes a lost-motion latch or load carrier pivot member 66, a slide member 68, a pair of actuators 70, and a front end securement 72. The trailer attachment assembly 30 is mounted between the left and right gooseneck frame members 52, 54 and does not extend above the tallest point of the gooseneck 24, so that equipment is easily loaded above or on top of the gooseneck as desired.

The load carrier pivot member 66 is a lost-motion latch in that its initial movement does not lift the deck, but rather, the initial movement latches the deck to the gooseneck. The load carrier 66 includes load carrier left and right ends 74, 76 which are spaced apart and are connected by an upper cross bar 78 and a bottom cross plate 80. The carrier ends 74, 76 generally comprise A-shapes with the upper cross bar 78 joining the peaks of the A's and the cross plate 80 joining the cross portions of the A's. A front plate 91 also extends between and connects to the carrier ends 74, 76. The front plate 91 also attaches to a pivot shaft tube 87. The front of the load carrier includes a securement leg 82, and the rear of the load carrier 66 includes a retainer leg 84. The cylindrical pivot shaft tube 87 is attached to the securement leg 82 and defines a pivot shaft opening 89 which receive a pivot shaft 86 therethrough. The pivot shaft 86 also extends through the lower ends 64 of the gooseneck frame members 52, 54 to pivotally connect the load carrier with the gooseneck 24. Preferably, the cylindrical pivot tube 87 extends between and slightly beyond the carrier ends 74, 76 and rotationally houses the pivot shaft therein. Safety pins (not shown) are inserted through the ends of the pivot shaft 86 to secure the pivot shaft in the gooseneck and load carrier. Thus, the carrier 66 is movably attached to the gooseneck frame 50 for shifting movement between the detached/released position and a locked/attached position engaging the deck and retaining the securement against release.

Figure 9:
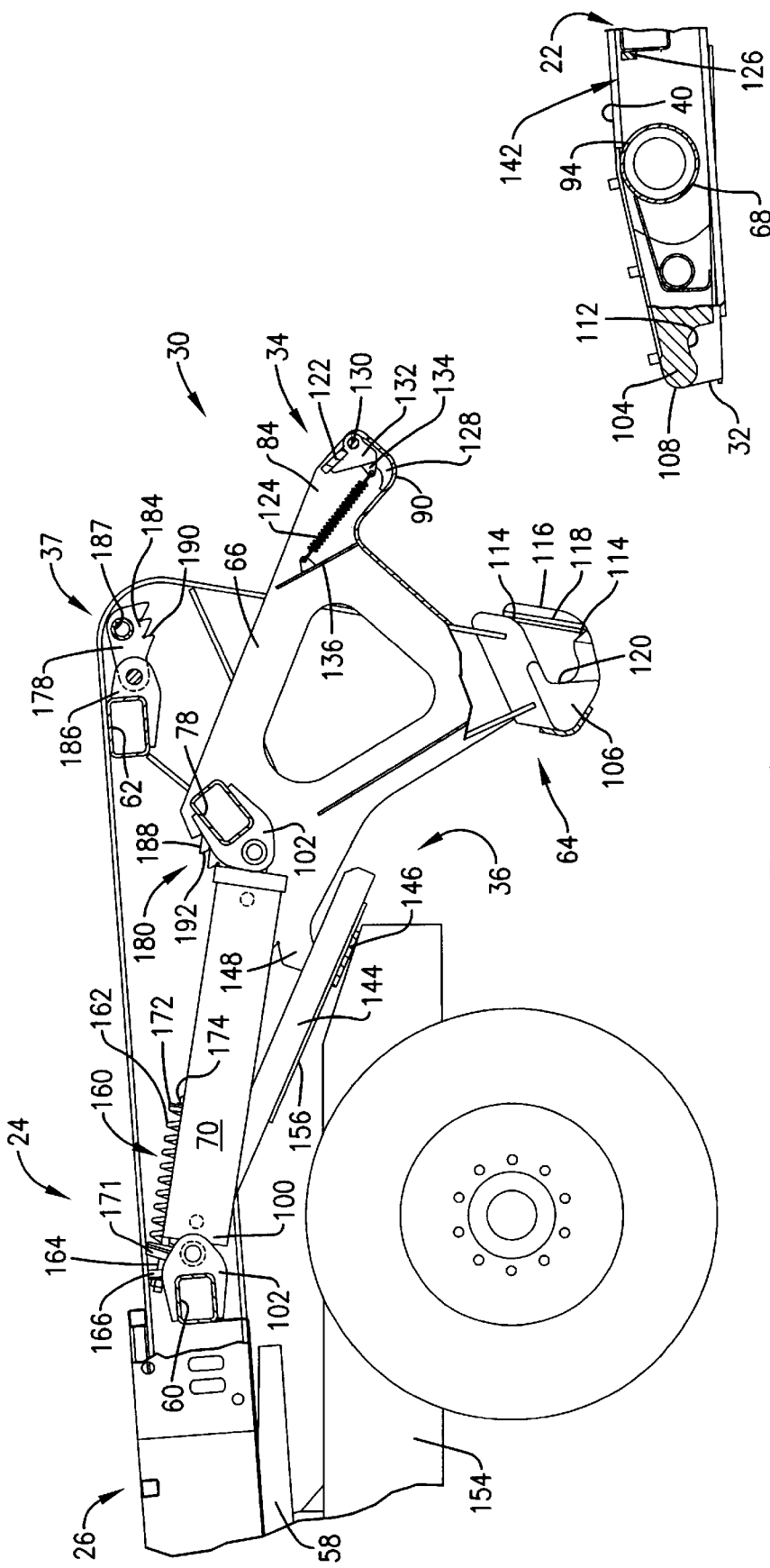
FIG. 9 is a fragmentary view in partial cross section of the trailer attachment assembly of FIG. 1 taken along line 9—9 in FIG. 8.

Referring to FIGS. 7 and 9, the retainer leg 84 includes a generally front-facing load carrier engagement surface 90. The load carrier engagement surface 90 preferably comprises a constant radius arc and extends substantially continuously between the carrier ends 74, 76. The load carrier engagement surface 90 faces forward and comprises an incline extending downwardly from the front to the back of the load carrier. Thus, the load carrier engagement surface 90 also inclines downwardly from the front end 32 to the back end 38 of the trailer deck 22. The load carrier engagement surface 90 is provided by lower, middle, and upper retainer leg surfaces 92A, 92B, 92C, respectively. The edges 93 of the retainer leg surfaces 92 are preferably chamfered. Additional bottom surfaces 95A, 95B, 95C close the rearward radius of the retainer leg, the forward radius of the securement leg, and the span between the pivot shaft tube and the rearward radius surface 95B, respectively. The retainer leg 84 also mounts the latch mechanism 34 between the carrier ends 74, 76.

Figure 10:
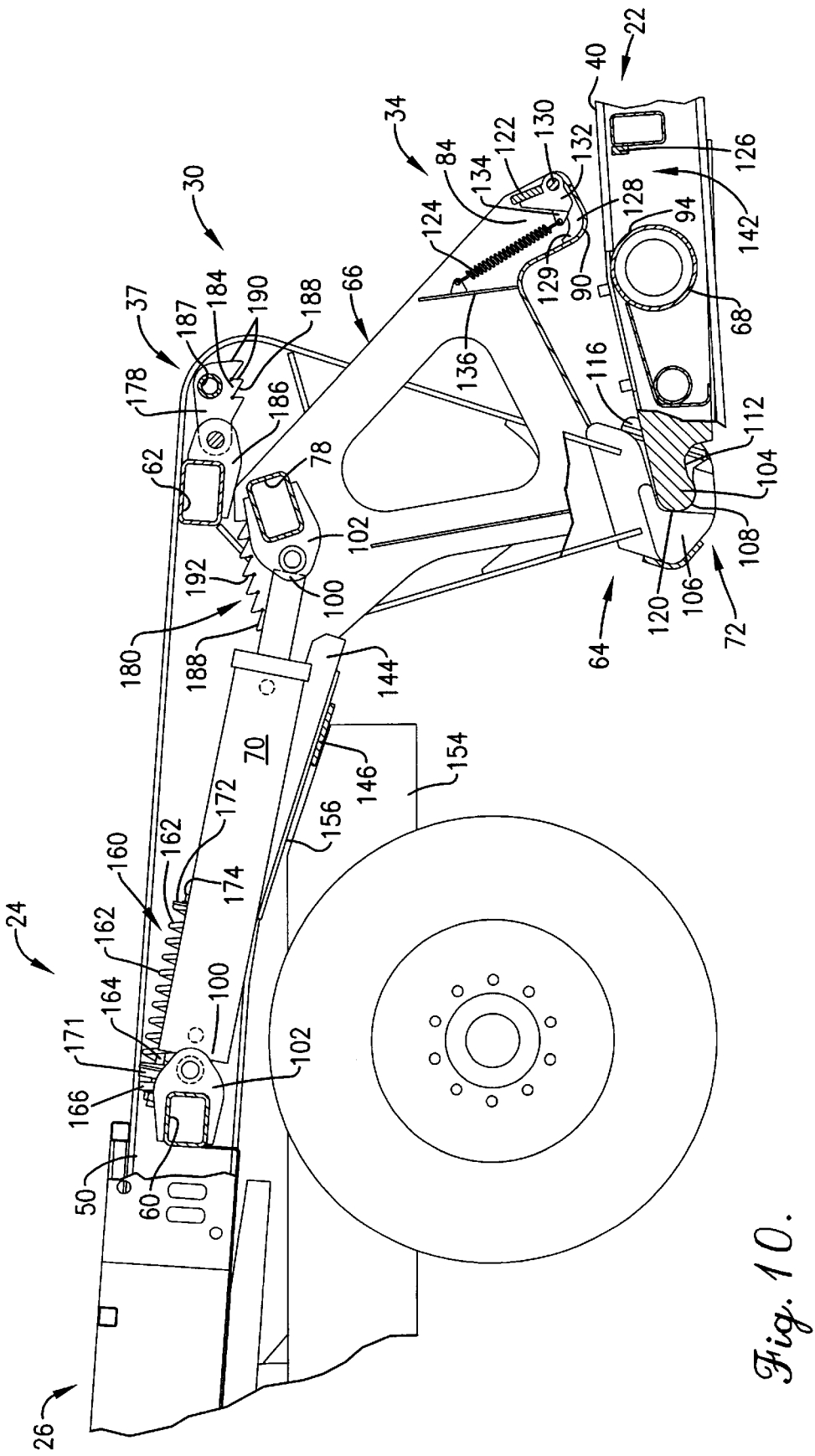
FIG. 10 is a fragmentary view in partial cross section of the trailer attachment assembly of FIG. 1 illustrating the step of FIG. 3 during detachment of the gooseneck to the trailer deck.

Referring to FIGS. 8 and 10, the slide member 68 preferably comprises a cylindrical slide tube mounted on the trailer deck with its highest point just below the trailer deck upper support surface 40. The slide member 68 provides a trailer deck slide member engagement surface 94 which faces generally rearward and is positioned rearward from the front end 32 of the trailer deck 22. The slide member engagement surface 94 preferably comprises a constant arc and is inclined downwardly from the trailer deck front end 32 to the trailer deck back end 38. Though both of the load carrier and slide member engagement surfaces 90, 94 are inclined, if desired only a selected one of the two engagement surfaces would be inclined. The slide member is preferably elongated between opposite left and right slide member ends 96, 98, and the slide member engagement surface 94 is substantially continuous between the slide member ends 96, 98. The slide member extends substantially perpendicular to and is centrally positioned with respect to the trailer deck central longitudinal axis. Thus, the slide member ends 96, 98 are positioned on opposite sides of the central trailer axis. Further, the carrier ends are also positioned on opposite sides of the central trailer axis with the slide member ends extending beyond the carrier ends. Both of the engagement surfaces 90, 94 are substantially smooth, so that the engagement surfaces can slide over each other.

Referring to FIGS. 6 and 8, the actuators 70 comprise hydraulic cylinders operatively coupled between the gooseneck frame forward cross bar 60 and the upper cross bar 78 of the load carrier 66. The actuators are symmetrically positioned with respect to the central longitudinal axis of the trailer 20. Each of the ends 100 of the actuators are pivotally connected to the respective cross bars by eight actuator pivot brackets 102 that are welded to the respective forward and upward cross bars 60, 78. The hydraulic cylinders are preferably powered by the towing vehicle's hydraulic system and are provided with controls (not shown) on the outer side of the left (driver's side) gooseneck frame member 52.

Figure 11:
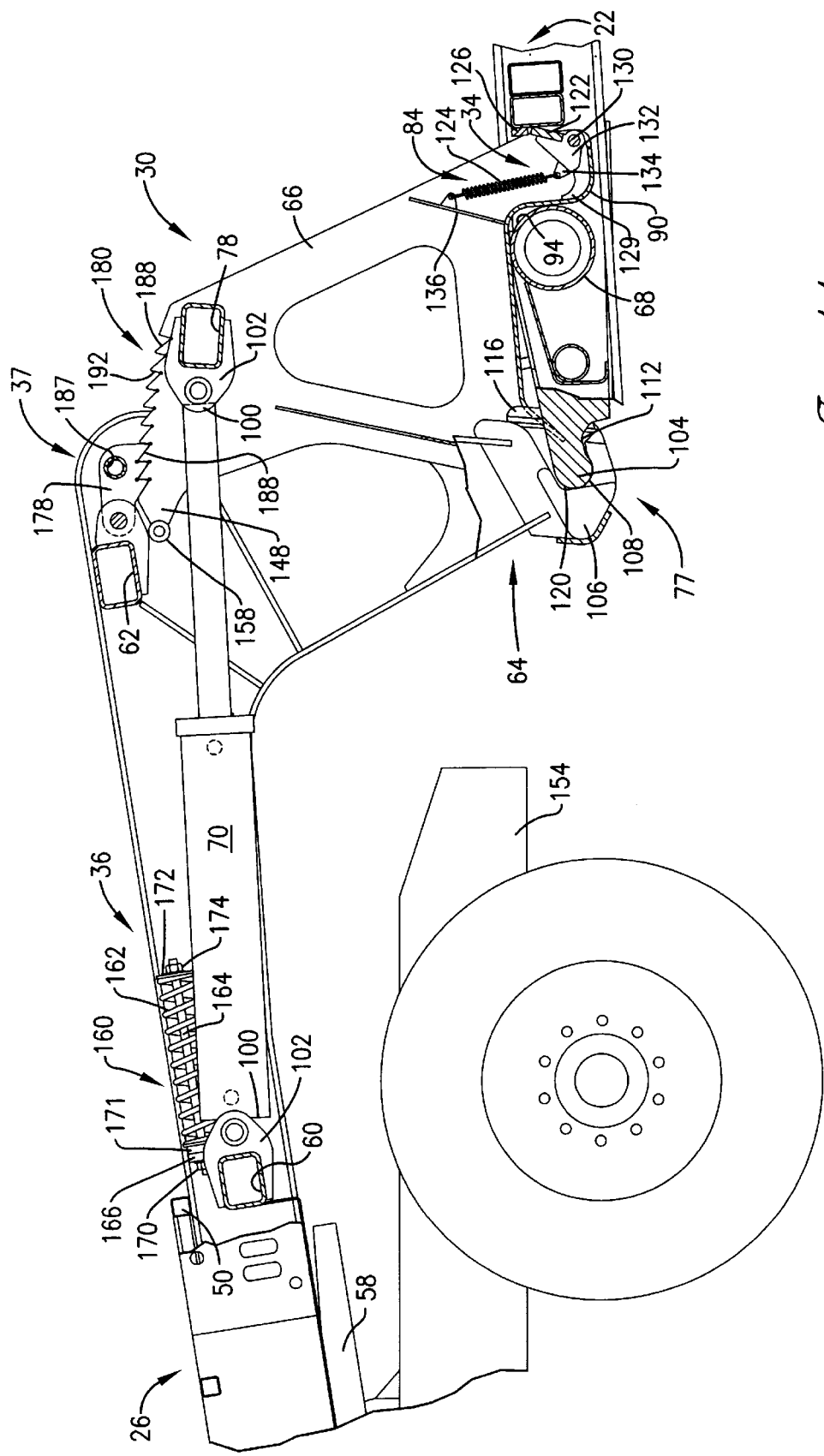
FIG. 11 is a fragmentary view in partial cross section of the trailer attachment assembly of FIG. 1 illustrating the trailer deck attached to the gooseneck as in FIG. 4.

Referring to FIGS. 8 and 11, the front end releasable securement 72 includes a pair of protrusions 104 and a pair of receivers 106 configured to receive the protrusions 104 and detachably and pivotally connect the lower end 64 of the gooseneck frame 50 with the front end 32 of the deck 22. The protrusions and receivers are positioned on opposite sides of the trailer longitudinal axis. The protrusions 104 preferably extend from the trailer deck, and the receivers are preferably defined by the gooseneck frame 50. Alternatively, the protrusions could be extended from a selected one of the trailer deck 22, load carrier 66, and gooseneck frame 50 with the receiver provided on another of the trailer deck 22, load carrier 66, and gooseneck frame 50. The protrusions 104 preferably extend in an inward direction substantially perpendicular to the longitudinal axis of the trailer 20. The forward faces 108 are preferably rounded to help guide the protrusions 104 into the receivers 106. Additionally, the inner forward corners 110 of the protrusions 104 are beveled to assist in alignment. The undersides of the protrusions include a recess 112 which allows the protrusions to pivot in the receivers 106 forming a second transverse axis at the securement. Thus, the trailer can buckle and unbuckle about the second transverse axis when the gooseneck is attached to the deck.

Referring additionally to FIG. 9, the receivers 106 are attached to the lower ends 64 of the gooseneck frame members 52, 54. The receiver openings open outward and rearward, and the edges 114, which extend around the upper, lower, and inner sides of the openings are beveled to guide the deck and gooseneck into alignment. Additional alignment plates 116 are attached to inner sides of the receivers 106. The alignment plates 116 also include beveled edges 118. The receiver openings widen from the base 120 to the rearward mouth to compensate for misalignment in the height of the protrusions and receivers. Thus, the upper and lower surfaces of the receivers 106 are inclined away from the centers. The alignment plates 116, beveled edges 114, and beveled corners 110 of the protrusions 104 compensate for misalignment of the receivers and protrusions in a side-to-side direction. The base 120 of the receiver opening is preferably curved to match the radius of the protrusion forward face 108 and allow the protrusions 104 to pivot in the receiver 106. Allowing the protrusions 104 to pivot in the receivers 106 allows an operator to adjust the ride height of the trailer deck. Alternatively, a pin and eyelet arrangement could be utilized for the front securement 72.

Referring again to FIGS. 8 and 11, the latching mechanism 34 includes a substantially rigid latch plate 122, a latch plate biasing member 124, and a substantially rigid catch 126. The latch plate is elongated and is pivotally mounted to the retainer leg 84 between the carrier ends 74, 76. Four latch pivot brackets 128 rotatably hold a latch pivot pin 130 which forms a pivot point about which the latch plate pivots. The latch pivot brackets 128 include an upturned tail 129 to reinforce the load carrier engagement surface 90. The latch plate is held by two plate mounts 132 positioned near the opposite ends of the plate between the latch pivot brackets, and the latch pivot pin 130 extends through the plate mounts 132 and pivot brackets 128. Lever arms 134 extend from the plate mounts 132 in a direction substantially opposite to the latch plate 122, so that the lever arms are fixed relative to the latch plate.

Figure 12:
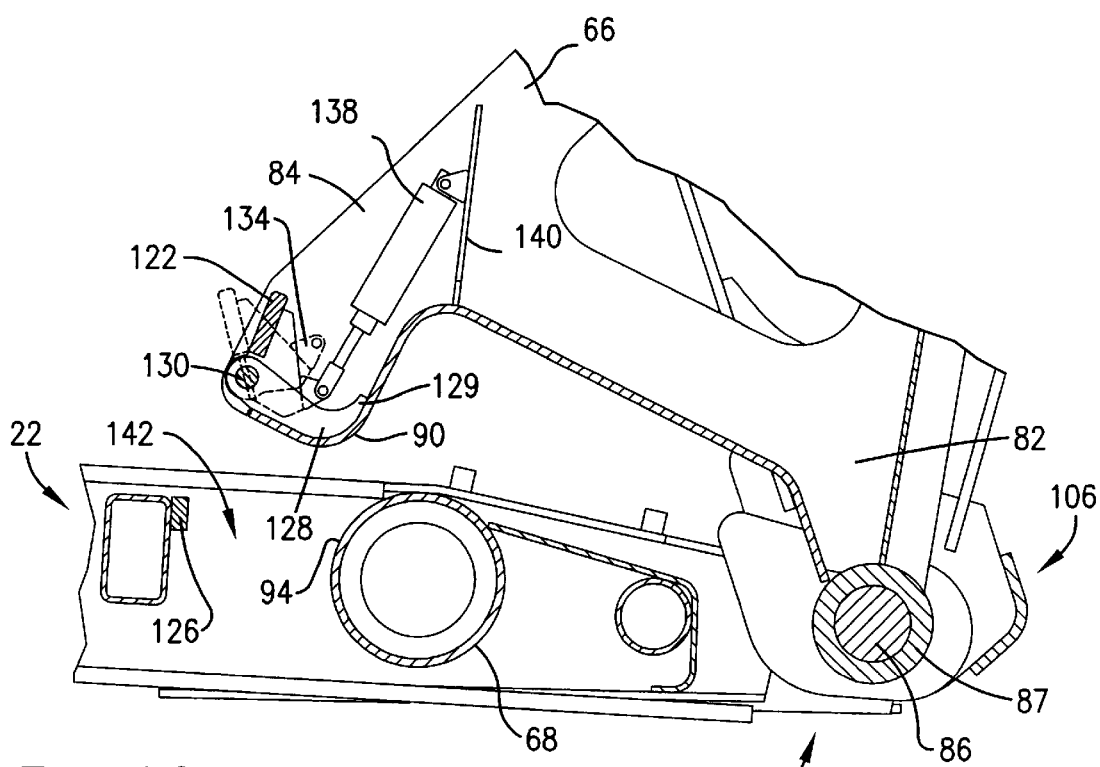
FIG. 12 is a fragmentary view in partial cross section of the trailer attachment assembly of FIG. 1 taken along line 12—12 in FIG. 8 and illustrating attachment of the trailer deck.

The biasing member 124 preferably comprises a tension spring attached to one of the lever arms and to a latch spring mount plate 136 which is connected to the right carrier end 76 and the bottom rearward radius surface 95A (FIG. 7). Because the latch spring 124 pulls upwardly on the lever arm 134, the latch plate 122 is biased toward an outward latched position. A retraction member 138, preferably an air cylinder, is connected to the other lever arm and to a retraction member mount plate 140 which is connected to the left carrier end 74 and to the bottom rearward radius surface 95A (FIG. 7). When the retraction air cylinder 138 is actuated, it overcomes the biasing member 124, forces the lever arm 134 downwardly, and pivots the latch plate 122 into the unlatched position within the confines of the retainer leg 84 as shown in FIG. 12 in solid lines. When pressure is released from the air cylinder 138, the latch biasing member 124 pivots the latch plate back into the latched position as shown in broken lines in FIG. 12.

Figure 13:
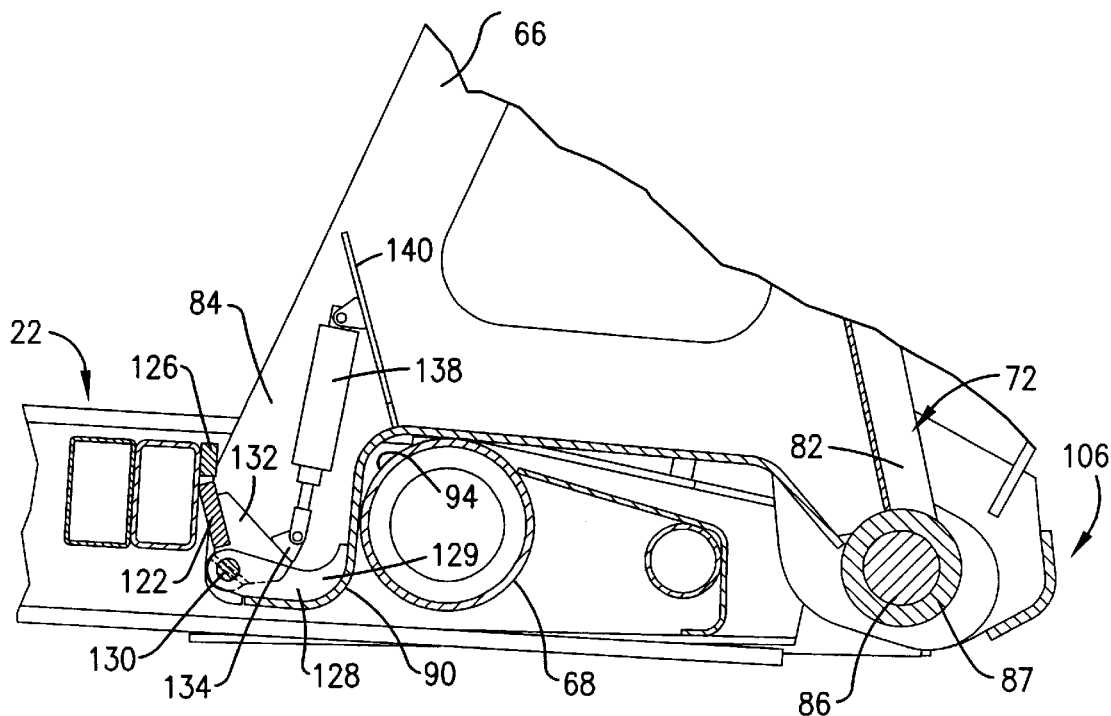
FIG. 13 is a fragmentary view in partial cross section of the trailer attachment assembly of FIG. 1 illustrating the trailer deck in an attached position.

Referring additionally to FIGS. 12 and 13, the catch 126 preferably comprises first and second catch blocks (FIG. 8) which are positioned adjacent to opposite ends of the latch plate 122. The catch 126 and slide member 68 define a retainer leg receiving opening 142 therebetween. The catch is mounted on the trailer deck opposite the slide member 68, and the latch plate 122 is inclined rearward; so that when the retainer leg is inserted into the receiving opening 142, the latch plate, being biased toward the rearward latched position, is pivoted slightly out of the latched position and slides over the catch 126. Thus, the latch plate 122 automatically engages the catch 126.

Referring to FIGS. 6, 14, and 15, the lift mechanism 36 includes a pair of carrier arms 144 joined by a carrier cross bar 146, and a pair of lift actuator arms 148 extending forward from the tops of the load carrier ends 74, 76. The carrier arms 144 are hingedly mounted about a hinge pin 150 provided by the outer actuator pivot brackets 102 mounted on the forward cross bar 60 of the gooseneck frame and carrier pivot brackets 152 also mounted on the forward cross bar 60. The carrier arms are preferably channels and pivot between lift positions in which they engage a towing vehicle frame 154 (FIG. 1) and retracted positions in which they are spaced apart, preferably above, the tow vehicle frame 154. The carrier cross bar 146 extends between the carrier arms 144 and engages the tow vehicle frame 154. The position of the carrier cross bar 146 is adjustable along the length of the carrier arms by fastening the carrier cross bar 146 to different locations along carrier cross bar mounts 156, preferably welded to the bases of the carrier arms 144.

The lift actuator arms 148 extend forward from the tops of the load carrier ends 74, 76 and terminate with a rounded skid 158, which is slidably received in the channels of the carrier arms 144 when the load carrier is pivoted into the detached position. The lift mechanism is also provided with a carrier arm biasing assembly 160 for each carrier arm. The carrier arm biasing assemblies are substantially identical and will be described with reference to only one of the biasing assemblies 160. The biasing assembly comprises a floating biasing member, preferably a compression spring 162, having a compression shaft 164 extending substantially centrally through the spring. The compression shaft 164 is received in a stationary slotted flange 166 which is attached to the forward cross bar 60 of the gooseneck frame 50. A first washer 168 and first end nut 170 secure the compression shaft 164 in the stationary slotted flange 166. The compression shaft also extends through a pivoting slotted flange 171 fastened to the carrier arm adjacent the pivot point 150, so that the pivoting slotted flange 171 pivots with the carrier arm. The opposite end of the compression shaft 164 includes a second flat washer 172 and second end nut 174. The spring 162 is positioned between the second flat washer 172 and the pivoting slotted flange 171, so that as the carrier arm pivots downwardly toward the lift position the spring is compressed between the flat washer 170 and the pivoting slotted flange 171. Preferably, a third flat washer 176 is interposed between the spring and the pivoting slotted flange 171 to stabilize the end of the spring 162 against the pivoting slotted flange 171.

As the load carrier 66 pivots toward the detached position, the skids 158 are moved into the channels of the carrier arms 144. As the carrier 66 continues to move, the skids slide forward and force the carrier arms 144 downward and compress the springs 162 until the carrier cross bar 146 rests on the towing vehicle frame 154 to support the gooseneck above the ground. When the actuators 70 are retracted, the load carrier 66 is moved toward the attached position moving the skids upward and sliding the skids 158 rearward in the channels. The biasing assemblies 160 force the carrier arms 144 upwardly to disengage them from the towing vehicle frame 154. As the carrier 66 continues to move toward the attached position, the carrier arms 144 reach the retracted positions above the vehicle frame 154 and the skids move out of the channels of the carrier arms 144.

Figure 16:
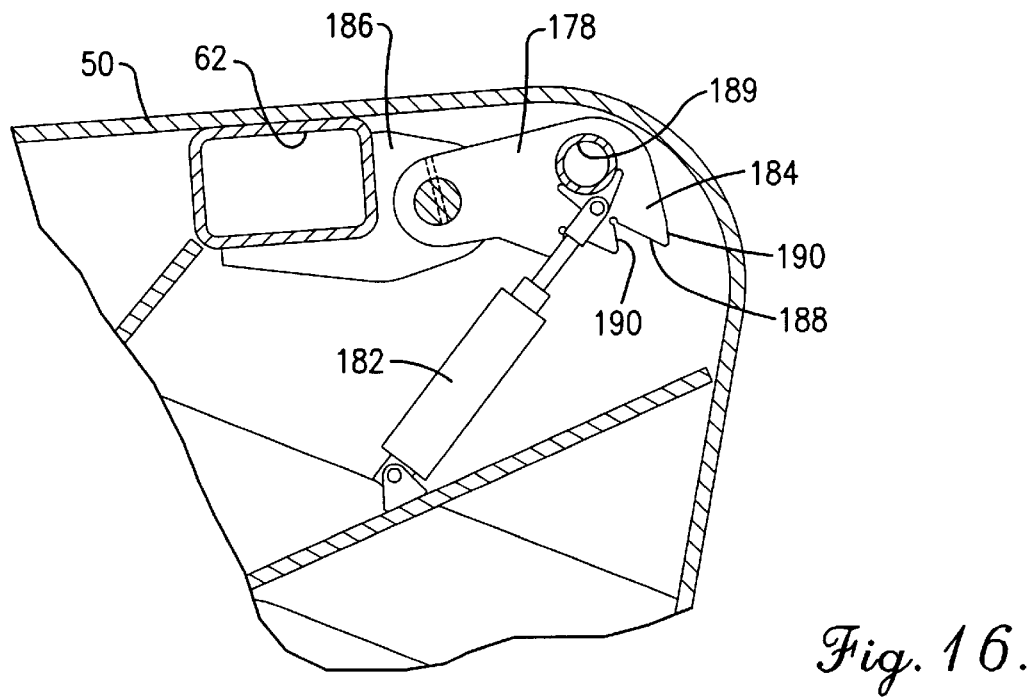
FIG. 16 is a fragmentary view in partial cross section of the ride height lock assembly of FIG. 6 taken along line 16—16 in FIG. 8.
Figure 17:
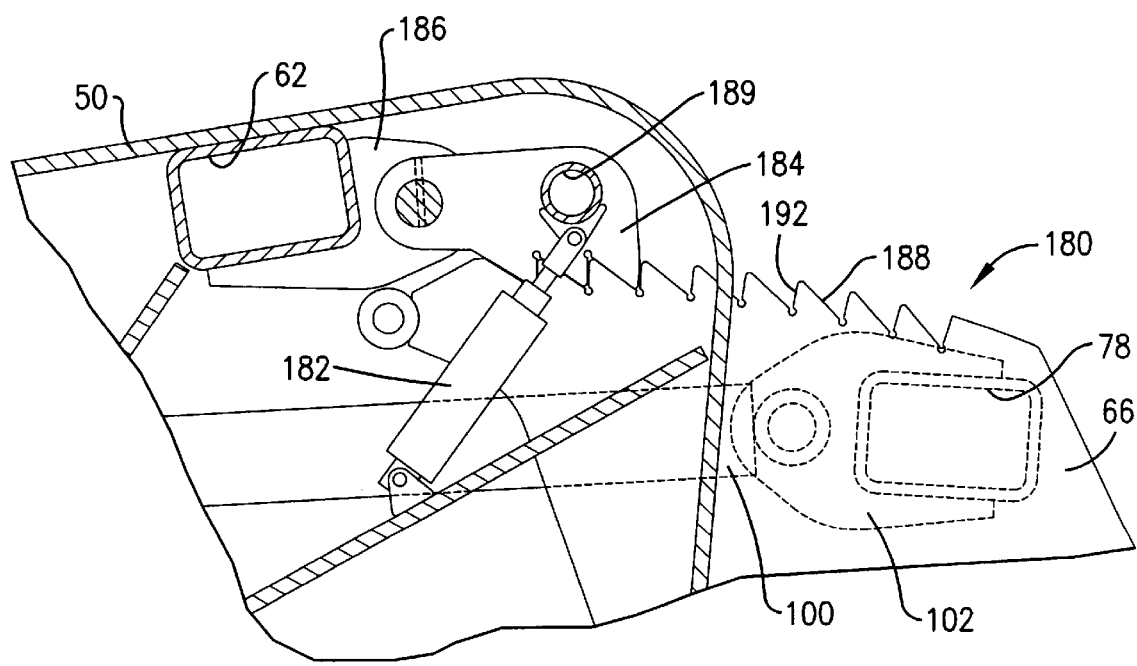
FIG. 17 is fragmentary view in partial cross section of the ride height lock assembly of FIG. 6 illustrating a maximum ride height position.

Referring to FIGS. 6, 16, and 17, the ride height lock assembly 37 preferably comprises a ratchet and pawl assembly having two pawls 178, two ratchets 180, and a lift member 182. The pawls 178 have pawl teeth 184 on their lower surfaces and are pivotally mounted on pawl brackets 186 attached to the gooseneck rearward cross bar 62. A tie rod 187 extends between the two pawls and extends outwardly from at least a left one of the pawls. A tie rod extension 189 provides an attachment for the lift member 182 and contacts the gooseneck left side flange 52 to stop the pawls from extending too far upward. The lift member 182 preferably comprises an air cylinder which can be on the same air circuit and have the same controls as the latching mechanism retraction air cylinder 138. Thus, the two cylinders 138, 182 can be actuated and released simultaneously. The lift member 182 is attached to the gooseneck left side frame member 52 and the tie rod extension 189 adjacent the left one of the pawls 178. When the lift member 182 is pressurized, its piston extends, and the pawls 178 are pivoted upwardly. The ratchets 180 comprise a plurality of ratchet teeth formed in the tops of the lift mechanism actuator arms 148, which extend from the carrier ends 74, 76.

When the lift cylinder 182 is depressurized, gravity pulls the pawl teeth 184 into engagement with the ratchet teeth preventing the carrier from moving toward the detached position. The ratchet and pawl teeth have forward inclined faces 188 allowing the pawl teeth 184 to ratchet as the actuators 70 extend and move the carrier toward the maximum ride height position. After the desired ride height is achieved, the actuators 70 are retracted slightly to seat the substantially vertical pawl and ratchet teeth surfaces 190, 192. With the vertical teeth surfaces 190, 192 seated, the trailer deck cannot detach from the gooseneck and the actuators 70 are not significantly loaded.

In operation, the trailer 20 is towed to a pick up location with the trailer deck attached and suspended above the ground as shown in FIGS. 4 and 5. The actuators 70 are extended a small distance to unseat the vertical pawl and ratchet teeth surfaces 190, 192. The retraction air cylinder 138 and lift cylinder 182 are pressurized substantially simultaneously disengaging the latch plate 122 from the catch 126 and the pawls 178 from the ratchets 180. The actuators 70 are then retracted rotating the load carrier 66 forward. The front end 32 of the trailer deck 22 then contacts the ground. The top of the carrier 66 continues to move forward rotating around the pivot shaft 86 to the position shown in FIGS. 3 and 10. The lift actuator arms 148 engage the carrier arms 144 and push the carrier arms 144 downwardly until the carrier cross bar 146 engages the towing vehicle frame 154. The towing vehicle 28 and gooseneck 24 are then pulled forward sliding the protrusions 104 out of the receivers 106. If the tow vehicle 28 is to be moved a greater distance, the carrier is rotated farther forward to the position shown in FIGS. 1 and 9 to lift the lower end 64 of the gooseneck 24 farther above the ground.

The equipment is then loaded onto the front end 32 of the trailer deck 22, positioned, and secured. The tow vehicle 28 and gooseneck 24 are then backed up to the front end 32 of the trailer deck 22. If necessary, the actuators 70 are extended or retracted as required, so that the lift mechanism 36 lowers or raises the gooseneck lower end 64 to adjust the height of the receivers 106 relative to the protrusions 104. The gooseneck 24 is then further backed up to the trailer deck 22 until the protrusions 104 are received at least partially in the receivers 106. If the gooseneck 24 and trailer deck 22 are misaligned side-to-side, the inner beveled edges 114, 118 of the receiver openings and alignment plates 116 engage the beveled corners 110 of the protrusions to align the gooseneck 24 with the trailer deck 22 in their side-to-side relationship. If the protrusions and receivers are misaligned in height, the curved forward faces 108 of the protrusions 104 are guided into position by the widened mouths and upper and lower edges 114 of the receivers 106. The widened mouths and curved forward faces function to guide the protrusions even when the front end 32 of the trailer deck 22 is tilted with respect to the gooseneck, causing one of the protrusions to be too high and the other protrusion to be too low for the respective receivers.

Occasionally, the trailer deck and gooseneck are misaligned to the extent that the protrusions are not fully received in the receiver by simply backing the gooseneck up to the trailer deck 22 or the driver simply fails to back the gooseneck a sufficient distance to fully engage the protrusions 104 in the receivers 106. With prior trailer attachment assemblies this would require the driver to realign the gooseneck 24 and trailer deck 22 or continue backing the gooseneck, forcing the trailer deck 22 to slide into closer alignment.

With the trailer attachment assembly 30 according to the present invention, the attachment process is continued without further manipulation of the towing vehicle 28. The retraction and lift air cylinders 138, 182 are depressurized rotating the latch plate 122 into the latched position and allowing the pawls 178 to drop. The carrier 66 is rotated rearward by extending the actuators, disengaging the lift mechanism 36 from the vehicle frame 154 and bringing the load carrier engagement surface 90 into engagement with the slide member engagement surface 94. As the actuators continue to extend and rotate the carrier 66, the retainer leg 84 is forced downwardly, and the load carrier engagement surface 90 slides over the slide member engagement surface 94, drawing the trailer deck 22 forward toward the gooseneck 24. If there is a relative tilt, the low end of the load carrier engagement surface 90 will first engage the high end of the slide member high end downwardly. This early engagement of the carrier and slide member ends is achieved by spacing the carrier and slide member ends from the central longitudinal axis of the trailer. When the retainer leg 84 is fully received in the retainer leg receiving opening 142, the protrusions 104 are fully seated in the receivers 106, and the latch plate 122 is in the latched position and held by the catch 126 as shown in FIG. 13.

The actuators 70 are further extended lifting the front end 32 of the trailer deck 22 off the ground. As the actuators 70 continue to extend, the carrier continues to rotate rearward until the pawl 178 slides over the tops of the carrier ends 74, 76 and engages the ratchet 180. When the pawl teeth are engaged in the rear most ratchet teeth, the trailer deck 22 is in its lowest ride position. When the pawl teeth 184 are engaged in the forward most ratchet teeth, the trailer deck is in its highest position. Once the trailer deck is at the desired ride height, the cylinders are retracted a small distance to take the load off the cylinders and seat the substantially vertical teeth surfaces 190, 192 of the pawls 178 and ratchets 180.

Therefore, the trailer attachment assembly 30 according to the present invention, simplifies the trailer attachment process by reducing the need to manipulate the towing vehicle 28 even when the gooseneck 24 and trailer deck 22 are positioned at a relative side-to-side tilt. Further, the latching mechanism 34 automatically latches the trailer deck 22 to the gooseneck 24, and the lift mechanism 36 according to the present invention utilizes lift actuator arms 148 to eliminate the need for a third hydraulic cylinder.

Although preferred forms of the invention have been described above, it is to be recognized that such disclosure is by way of illustration only, and should not be utilized in a limiting sense in interpreting the scope of the present invention. Modifications to the exemplary embodiments, as herein above set forth, could be readily made by those skilled in the art without departing from the spirit of the appended claims.

The inventors hereby state their intent to rely on the Doctrine of Equivalents to determine and assess the reasonably fair scope of their invention as pertains to any apparatus or method not materially departing from but outside the literal scope of the invention as set out in the following claims.

We claim:

1. A trailer for receiving cargo thereon and for attachment to a towing vehicle to transport cargo, the trailer comprising:

a gooseneck including a substantially rigid frame having a lower end, an upper end, and a towing vehicle attachment adjacent the upper end for attaching the gooseneck to the towing vehicle, said gooseneck further including a load carrier movable relative to the frame between a detached position and an attached position;

a substantially rigid trailer deck having a front end, a back end, a central longitudinal axis extending from the front end to the back end, and transversely extending towing structure rearwardly spaced from the front end of the deck, said load carrier having a retainer leg that is hooked behind said towing structure in engagement therewith when the load carrier is in said attached position to establish a towing connection between the gooseneck and the deck, said towing structure including generally rearwardly facing surface portions that are spaced outwardly in opposite lateral directions from said central longitudinal axis of the deck, said retainer leg including generally forwardly facing surface portions that are spaced outwardly in opposite lateral directions from said longitudinal axis of the deck in disposition to engage said rearwardly facing surface portions of the towing structure when the load carrier is in said attached position;

a plurality of ground engaging wheels rotatably mounted to the trailer deck;

a securement establishing a lifting connection between the gooseneck and the front end of the deck, said securement being disposed forwardly of said retainer leg and said towing structure, said securement including components on the frame and the deck that are spaced outwardly in opposite lateral directions from said central longitudinal axis of the deck; and an actuator operatively coupled between said frame and the load carrier to move the load carrier between said detached and attached positions.

2. The trailer according to claim 1 wherein said surface portions of the towing structure and the retainer leg comprise cam surfaces configured in such a manner as to cause the deck and the gooseneck to be drawn relatively toward one another as the load carrier is moved to said attached position.

3. The trailer according to claim 1 wherein the load carrier is pivotally mounted to the gooseneck frame.

4. The trailer according to claim 2 wherein the load carrier is pivotally mounted to the frame adjacent the lower end of the frame for movement of the load carrier about a transverse horizontal pivot axis, said securement components on the frame being located substantially at said pivot axis of the load carrier.

5. The trailer according to claim 2 wherein said towing structure comprises an elongated cylindrical member presenting an arcuate rear face that forms the cam surface of the towing structure.

6. The trailer according to claim 5 wherein said retainer leg of the load carrier has a transverse width that is slightly less than the length of said cylindrical member, said cam surface on the retainer leg and said cam surface on the cylindrical member being continuous over the full width of the load carrier.

7. The trailer according to claim 6 wherein said deck has an elongated, transversely extending opening behind the cylindrical member within which said retainer leg of the load carrier is received.

8. The trailer according to claim 1 wherein said components of the securement comprise a pair of laterally spaced protrusions and a pair of laterally spaced receivers for said protrusions.

9. The trailer according to claim 8 wherein said protrusions are on the deck and the receivers are on the frame of the gooseneck.

10. A trailer for receiving cargo thereon and for attachment to a towing vehicle to transport cargo, the trailer comprising:

a substantially rigid gooseneck frame having a lower end, an upper end, and a towing vehicle attachment adjacent the upper end for attaching the gooseneck frame to the towing vehicle;

a load carrier connected to the gooseneck frame, the load carrier having a retainer leg including a load carrier engagement surface, and the load carrier being movable between a detached position and an attached position;

a substantially rigid trailer deck having a front end, a back end, a central longitudinal axis extending from the front end to the back end, and a trailer deck engagement surface rearwardly spaced from the front end of the deck;

a plurality of ground engaging wheels rotatably mounted to the trailer deck;

a front end securement protrusion extending between the trailer deck and the gooseneck frame, the securement protrusion being positioned forward of the load carrier and trailer deck engagement surfaces;

a front end receiver receiving the protrusion therein to secure the front end of the trailer to the gooseneck frame;

an actuator operatively coupled between the gooseneck frame and the load carrier to move the load carrier relative to the gooseneck frame and relative to the trailer deck and bring the trailer deck engagement surface into engagement with the load carrier engagement surface and draw the trailer deck toward the gooseneck frame; and an automatic latching mechanism including a latch plate pivotally mounted on the retainer leg and having a latched position and an unlatched position, a biasing member engaging the latch plate and biasing the latch plate toward the latched position, and a catch connected to the trailer deck and positioned to engage the latch plate when the load carrier is in the attached position and the latch plate is in the latched position.

11. A trailer for receiving cargo thereon and for attachment to a towing vehicle to transport cargo, the trailer comprising:

a substantially rigid gooseneck frame having a lower end, an upper end, and a towing vehicle attachment adjacent the upper end for attaching the gooseneck frame to the towing vehicle;

a load carrier connected to the gooseneck frame, the load carrier having a retainer leg including a load carrier engagement surface, and the load carrier being movable between a detached position and an attached position;

a substantially rigid trailer deck having a front end, a back end, a central longitudinal axis extending from the front end to the back end, and a trailer deck engagement surface rearwardly spaced from the front end of the deck;

a plurality of ground engaging wheels rotatably mounted to the trailer deck;

a front end securement protrusion extending between the trailer deck and the gooseneck frame, the securement protrusion being positioned forward of the load carrier and trailer deck engagement surfaces;

a front end receiver receiving the protrusion therein to secure the front end of the trailer to the gooseneck frame;

an actuator operatively coupled between the gooseneck frame and the load carrier to move the load carrier relative to the gooseneck frame and relative to the trailer deck and bring the trailer deck engagement surface into engagement with the load carrier engagement surface and draw the trailer deck toward the gooseneck frame; and a lift mechanism including a carrier arm hingedly connected to the gooseneck frame and a lift actuator arm extending forward from the load carrier to engage the carrier arm and force the carrier against a towing vehicle frame when the load carrier is moved to the detached position.

* * * * *